June 4, 1940.  A. LOVGREN  2,203,169
TOOL FOR CLEANING AND DRESSING FISH
Filed Aug. 20, 1938
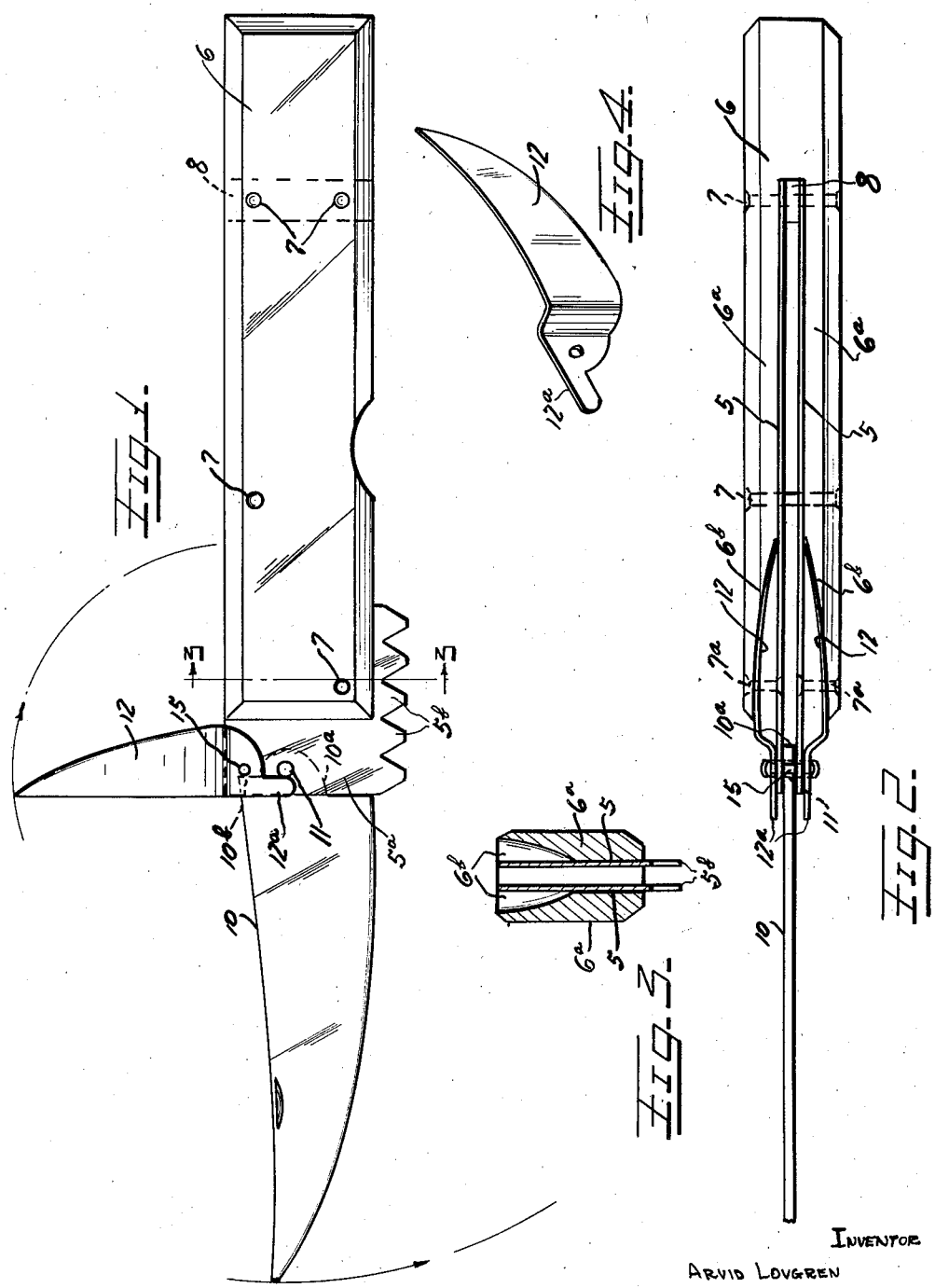
INVENTOR
ARVID LOVGREN
By Adam E. Fisher
ATTORNEY Patented June 4, 1940

2,203,169

UNITED STATES PATENT OFFICE 2,203,169

TOOL FOR CLEANING AND DRESSING FISH

Arvid Lovgren, St. Paul, Minn.

Application August 20, 1938, Serial No. 225,853

2 Claims. (Cl. 17—7)

This invention relates to tools, knives or implements for cleaning and dressing fish, and the essential purpose of the invention is to provide in a compact and convenient assembly or unit, the several devices needed for removing the scales and fins and for cutting off the head and tail and opening the body for cleaning.

Another object is to provide an oblong handle having a pair of oblong metal strips or plates supported in the handle in a slightly spaced relation side by side for forming a receptacle for a knife blade pivotally mounted thereinbetween, these plates having series of scaling teeth formed at their predetermined forward ends adjacent the mounting of the said knife blade, there being pivotally mounted at this end of the assembly also a pair of inwardly curved fin blades, one at each outer side of the said oblong plates, and arranged to close or fold back rearwardly and reversely to the mode of closing of the said central blade. The central or cutting blade opens in straight out axial alignment with the handle and closes into the handle in a conventional manner. The fin blades close to the outer sides of the plates reversely to the closing movement of the central blade, and the fin blades open out perpendicularly to the axis of the handle and are curved inward so as to mutually embrace the body of the fish starting at the head, and so as to enable the operator with a single pull or draw upon the implement to strip off the fins of the fish.

Still another object is to provide an implement of the kind referred to, the same including a pair of oblong metal strips or plates having rows of scaling teeth formed at their predetermined forward ends, these plates being set side by side in a suitable handle and slightly spaced apart for pivotally engaging therein between, a central cutting knife which is mounted to open straightly out in axial alignment with the handle and to close into the space between the said plates in a conventional manner, and a pair of inwardly curved fin knives pivotally mounted at the ends of the plates, at the outer sides thereof and immediately above the point of pivotal mounting of the central cutting blade, these fin knives or blades being arranged to close slidably against the outer sides of the said metal plates, and to open out perpendicularly to the handle in their operative position.

Still another object is to provide an implement of the kind referred to, including a pair of scaling plates or scale plates which also serve as handle plates, the plates having rows of scaling teeth formed at one end along a side margin, and being set side by side in a handle and slightly spaced apart to engage a central cutting blade, a relatively large, central cutting blade formed and pivoted in a conventional manner between the plates at the ends carrying the rows of scaling teeth, and adapted to close between the plates through one edge thereof, and a pair of inwardly curved fin blades or knives pivoted immediately back of the pivot point of the central blade and arranged close to the outer sides of the plates, these blades or knives opening perpendicularly to the axis of the handle, and the rivets or pivot elements of the several blades or knives being positioned and arranged to mutually support the respective blades in their opened position.

With the foregoing and other objects and advantages in view, such as may be developed in the following specification, attention is now directed to the accompanying drawing as illustrating a preferred embodiment of the invention, and wherein:

Figure 1 is a side elevation of the tool or implement, all of the blades thereof being shown open, as in their operative position.

Figure 2 is a top edge view of the assembly of Figure 1, the fin blades however being shown as closed.

Figure 3 is a section on the line 3—3 of Figure 1.

Figure 4 is a perspective detail of one of the fin blades or knives.

This invention comprises a pair of oblong, metal scale plates or handle plates 5, set together in a slightly spaced relation after the manner of the side plates of a conventional pocket knife, and as clearly shown in Figure 2. For the purpose of effectually mounting these plates, a bifurcated handle 6 is provided and the blades are positioned at the inner sides or faces of the prongs 6a thereof, being secured in place by means of long rivets 7 passed through the parts. Short rivets 7a serve to bind the prongs individually to the plates at the predetermined forward end of the device, so as to leave an uninterrupted clearance between the plates at this end for the reception of the central knife or blade to be described. A filler piece 8 is preferably inserted between the rear ends of the plates to maintain these plates in their spaced relation.

The scale plates 5 extend at their ends beyond the ends of the prongs 6a of the handle, at the forward or working end of the implement, as shown at 5a, and these plates at this end also extend downwardly and are projected outwardly and are then serrated to form scaling teeth 5b, there being provided thus two series of these teeth, one on each of the plates, and arranged in transverse alignment.

A relatively large, central cutting blade 10 is pivoted in a conventional manner by means of a heavy rivet 11, between the forward ends 5a of the plates 5, the rivet being passed through the inserted rounded end 10a of the blade, this end of the blade immediately back of the rounded portion being squared to form a stop shoulder 10b. This blade is thus adapted to open and close in a conventional way, and when opened is designed to stand straight out in axial alignment with the handle, being so maintained by means later to be pointed out.

A pair of complemental, inwardly curved and horn-like fin blades 12 are pivoted also at this same end of the tool to which the cutting blade is mounted, one of the blades being located at the outer side of each of the plates 5, being pivotally secured to the stripped or bared ends 5a by means of a rivet 15 passed directly through the rounded inner ends or butts of the blades. These blades are thus pivoted and arranged so as to fold or close inwardly upon the handle, at the outer sides of the plates 5, in a direction the reverse of the direction of closure of the central cutting blade 10, and therefore the outer corners of the handle prongs 6a are cut away to provide clearances 6b for the accommodation of these blades. The directions of closure of the respective blades are indicated by the arrows in Figure 1. The fin blades 12 are extended upon their back edges or margins, longitudinally outward beyond their pivot points to form and provide stop lugs 12a, which lugs, as these two blades are opened out from the handle, strike upon the extended ends of the rivet 11, which pivotally secures the cutting blade 10, when the blades have reached a position perpendicular to the axis of the handle and as clearly shown in Figure 1, whereby these blades are locked in their stated perpendicular and operative position. On the other hand the shoulder 10b of the cutting blade 10, as this blade is opened out for use, similarly abuts upon the rivet 15 which secures the blades 12 in place, whereby the blade 10 is likewise locked into its normal and operative position of axial alignment with the handle. It will thus be noted that the rivet 15 is located immediately back of the rivet 11, on a line perpendicular to the longitudinal axis of the handle, these alignments being essential to the described and operative association of the several elements.

In the tool as thus designed and constructed, it will be noted that the scale plates 5 serve also as and for the metal side plates of the entire knife assembly, serving to support at their forward ends both a central cutting blade closing to one side, and a pair of fin blades closing to the opposite side, with the pivot rivets of each acting as stops for the other, to lock same in their opened and operative positions. It will also be noted that the pair of fin blades 12 are mutually curved inwardly towards one another, whereby they are adapted to embrace the body of a fish at each side, in the use of the implement. The blades are of course all to be sharpened upon their leading or working edges.

In the use of this implement the larger and central blade 10 is designed for cutting off the head and tail of the fish, and for opening and cleaning the body. The teeth 5b of the scale or handle plates are for scraping off the scales of the fish, while the fin blades 12 are for cutting off the fins. This latter operation is performed by drawing these curved blades down over the head of the fish which they nicely embrace due to their curvature, one blade passing to either side thereof, thus enabling the operator to clear both sides of the fish with one movement of the implement.

If desired, the central cutting blade may be omitted from the assembly, and the device made and assembled with the pair of fin blades only, since certain users might desire this simpler assembly alone.

In the use of the implement it may be restated that the normal extension of the cutting blade in operation is in longitudinal alignment with the axis of the handle, while the extension of the pair of fin blades when opened in use is substantially perpendicular to the said axis, this being found to be the more convenient and effectual arrangement of the said blades. It will also be noted that the central cutting blade is arranged to close in a direction towards the rows of scaling teeth formed on the handle plates, while the fin blades close oppositely.

While I have herein set forth and described in the specification and have illustrated in the drawing, a certain preferred embodiment of this invention, together with certain specific structural features thereof, I reserve the right to modify or vary these structural features and the said embodiment in minor details for the purpose of providing a practicable implement for the intended purposes, not departing however from the essence of the invention as set forth in the appended claims, or claims later to be filed.

I claim:

1. A tool of the kind described, comprising a bifurcate handle with oblong prongs, oblong side plates seated at the inner faces of the handle prongs in parallel and slightly spaced relation to provide a blade receptacle therein between, the predetermined forward ends of the plates being extended beyond the handle endwise and at one side, the exposed margins of the plates at the one side being serrated to provide rows of scaling teeth, a cutting blade pivoted between the plates at the forward extended end thereof, the blade being arranged to open out axially with the handle and to close down into the plates between the rows of scaling teeth, and a pair of complemental fin blades also pivotally mounted at the forward end of the plates, the fin blades being mounted at the outer sides of the side plates and with their point of pivotal mounting disposed immediately back of the point of pivotal mounting of the cutting blade, these fin blades being arranged to close reversely to the mode of closure of the cutting blade and to open out perpendicularly to the handle, the rivets forming the pivotal mountings of the several blades being adapted to serve mutually as stops for one another to maintain the blades in their opened and operative positions.

2. In an implement of the kind described, a pair of oblong plates arranged side by side in a slightly spaced relation, a handle rigidly anchored to the plates and maintaining them in the stated position and relation, an elongated cutting blade mounted pivotally between the plates at one end thereof by means of a rivet passed through the plates and the butt end of the blade, this blade being thus arranged to close between the plates in one direction of movement and to open out axially with the plates for use, and a pair of arcuate, inwardly curved fin blades pivotally mounted by means of a common rivet at the outer side of the plate ends supporting the cutting blade, the said rivet being passed through the butts of the blades and the plate ends immediately back of the rivet pivotally securing the cutting blade in place, whereby the two mounting rivets mutually serve as stops for the cutting blade and the pair of fin blades, the rivet of one serving as a stop for the other, to maintain either in open and operative position.

ARVID LOVGREN.